United States Patent Office 3,733,423
Patented May 15, 1973

3,733,423
HYDROGENATED ERGOT ALKALOID COMPOSITIONS AND METHODS OF USING SAME
Botond Berde, Basel, Switzerland, assignor to Sandoz Ltd. (also known as Sandoz AG), Basel, Switzerland
No Drawing. Continuation-in-part of abandoned application Ser. No. 691,142, Dec. 18, 1967. This application Nov. 23, 1970, Ser. No. 92,206
Claims priority, application Switzerland, Dec. 22, 1966, 18,385/66
Int. Cl. A61k 27/00
U.S. Cl. 424—253                    15 Claims

ABSTRACT OF THE DISCLOSURE

The invention concerns a novel hydrogenated ergot alkaloid composition comprising one part by weight of a hydrogenated ergot alkaloid constitutent selected from the group consisting of dihydroergocornine, dihydroergocristine, dihydroergocryptine, and their pharmaceutically acceptable acid addition salts, and between 10 and 150 parts by weight of 7-(2-hydroxypropyl)-theophylline.

The 7-(2-hydroxypropyl)theophylline not only significantly enhances the enteral effect of oral effectiveness of the hydrogenated ergot alkaloid constituent, but various properties of the composition are superior to its individual components. The composition is particularly suitable for improvement of cerebral and peripheral blood flow.

---

This is a continuation-in-part of copending application Ser. No. 691,142, filed Dec. 18, 1967, now abandoned.

The invention relates to an improved hydrogenated ergot alkaloid composition.

The hydrogenated ergot alkaloids dihydroergocornine, dihydroergocristine and dihydroergocryptine and certain acid addition salts thereof are well known. The production thereof is described in Helv. chim. Acta 26, 2070 (1943). Also well known are the valuable pharmacodynamic properties of the said alkaloids. More particularly, they exhibit adrenolytic and vasodilatory effects, and inhibit central circulatory reflexes. Furthermore, the value of said alkaloids is known and there are many hundreds of publications dealing with their pharmacological properties and favourable clinical reports.

One serious disadvantage of said hydrogenated ergot alkaloids is their poor enteral effect or poor resorption from the intestinal tract. Thus, with a 1:1:1 mixture of the methane sulphonates of said hydrogenated ergot alkaloids, it has been found that a dose of about 56 μg./kg. administered intraduodenally is required in order to produce the same effect as about 7 μg./kg. administered intravenously [Helv.physiol. Acta 9, C 76 (1951)]. Therefore, with peroral administration for example, it is necessary to administer a dose about 8 times greater than is required with intravenous administration. Peroral administration is clearly the most convenient mode of administration, and hence it is most convenient to make pharmaceuticals available for peroral administration, such as in tablet form.

The said hydrogenated ergot alkaloids are exceptionally costly, and one object of this invention is to increase the enteral effect thereof. It has been found that a surprisingly satisfactory and long lived increase in the enteral effect of said hydrogenated ergot alkaloids is achieved by combination with 7-(2-hydroxypropyl)-theophylline. A measure of the increase in enteral effect can be obtained by the well-known test in which the adrenalin inhibiting activity of the alkaloids is measured in situ in cats which are under urethane/chloralose narcosis. In this test, which is described in Helv.physiol.Acta 9, C 76, (1951), the volume decrease (determined by plethysmography) produced in the kidneys by adrenalin (4 μg./kg. adrenalin hydrochloride administered i.v.) is used as the standard volume decrease. This test was carried out with compositions and dosages as indicated below.

Test 1.—An aqueous solution, adjusted to a pH of 7.0, and containing a total of 112 μg. of the methane sulphonates of dihydroergocornine, dihydroergocristine and dihydroergocryptine (1:1:1) and 11.2 mg. of 7-(2-hydroxypropyl)theophylline for every ml. of solution was administered to 10 cats introduodenally. The dose of hydrogenated ergot alkaloids amounted to 56 μg./kg. After the effect of the alkaloids had faded away, the same does (56 μg./kg.) of hydrogenated alkaloids (methane sulphonates) alone was administered introduodenally to the same animals. The results of the adrenalin inhibiting activity obtained in the comparative tests are given in Tables I and II below.

TABLE I

| | Percent | | | | | | |
|---|---|---|---|---|---|---|---|
| Time | 15' | 35' | 55' | 75' | 95' | 115' | 135' |
| Effect of the alkaloids alone | 26 | 40.5 | 35.3 | 31.2 | 30.6 | 23.1 | 23.9 |
| Effect of the alkaloids plus 7-(2-hydroxy-propyl)theo-phylline (1=100) | 52.6 | 62.7 | 60.7 | 51.2 | 44.4 | 40.5 | 30.4 |

TABLE II

| | Maximum effect | Duration of effect, minutes | Total effect [1] |
|---|---|---|---|
| Alkaloids alone | 47.9% after 53 minutes. | 144 | 210.6 |
| Alkaloids plus 7-(2-hydroxypropyl)-theophylline. | 70.5% after 38 minutes. | 190 | 342.5 |

[1] Sum of the inhibition values in Table I.

As will be clear from the values obtained, the enteral effect of the solution containing 7-(2-hydroxypropyl)theophylline is considerably greater than that of the comparison dose (alkaloids alone). The increase in the enteral effect is more clearly reflected by the figures in Table II, where the maximum percentage effect, the time for such maximum effect to take place, and the duration of effect, are given.

Test 2.—An aqueous solution adjusted to a pH of 7.0, and containing 3% of ethanol and 112 μg. of dihydroergocristine methane sulphonate and 11.2 mg. of 7-(2-hydroxypropyl)theophylline for every ml. of solution was used in a test as described above. 56 μg./kg. of dihydroergocristine methanesulphonate alone and dihydroergocristine methanesulphonate combined with 7-(2-hydroxypropyl)theophylline, were administered introduodenally to six cats. The results are shown in Tables III and IV below.

TABLE III

| | Percent | | | | | | |
|---|---|---|---|---|---|---|---|
| Time | 15' | 35' | 55' | 75' | 95' | 115' | 135' |
| Effect of dihydroergocristine alone | 26.6 | 39.9 | 29.1 | 21.5 | 15.9 | 15.6 | 8.2 |
| Effect of dihydroergocristine plus 7-(2-hydroxypropyl) theophylline (1=100) | 52.7 | 54 | 47.5 | 36.2 | 34.5 | 32.2 | 28.6 |

TABLE IV

| | Maximum effect | Duration of effect, minutes | Total effect [1] |
|---|---|---|---|
| Dihydroergocristine alone | 40% after 35 minutes. | 138 | 156.8 |
| Dihydroergocristine plus 7-(2-hydroxypropyl)theophylline. | 59.6% after 25 minutes. | 181 | 285.7 |

[1] Sum of the inhibition values in Table III.

The values obtained and given in Tables III and IV again reflect the greater enteral effect obtained with the solution containing 7-(2-hydroxypropyl)theophylline.

Test 3.—A further identical and separate test was carried out with the 7-(2-hydroxypropyl)theophylline constituent alone for the purpose of establishing whether the compound itself exhibited any influence on the effect of adrenalin. Apart from insignificant fluctuations within the normal range of variations, no influence on the effect of adrenalin on the volume of the kidneys could be observed.

Not only is the enteral effect of said hydrogenated ergot alkaloids very satisfactorily improved by combination with 7-(2-hydroxypropyl)theophylline, but unexpected and highly advantageous effects on the activity of said hydrogenated ergot alkaloids occur which render the composition particularly suitable for improving cerebral and peripheral blood flow. More particularly, cardiovascular effects of the composition as compared with the hydrogenated ergot alkaloids alone are surprisingly modified as shown in the test on the perfused hind limb of the dog. This test is particularly suitable for the investigation of the effects of ergot alkaloids on vascular resistance, likewise permitting measurement of alpha-adrenergic blocking activity. In this experimental set-up both hind limbs are perfused simultaneously, but independently with a constant volume of the dogs own blood, and vascular resistance is measured as a function of the perfusion pressure. It has been observed that the effect of ergot alkaloids of the peptide type depend upon the existing vascular resistance. If the vascular resistance is low, the hydrogenated ergot alkaloids lead to increased vascular tone and hence to a rise in peripheral resistance. However, when the existing vascular resistance before infusion of the alkaloids is high, the same dose produces a fall in peripheral resistance, i.e. gives rise to vasodilatation. Thus, it is possible to determine in a series of tests, the level of peripheral resistance at which constriction gives place to dilatation. Thus, for example, with a 1:1:1 mixture of the methane sulphonates of dihydroergocornine, dihydroerocristine and dihydroergocryptine alone, the inversion point is at 4.5 resistance units $$\left( 1 \text{ resistance unit} = \frac{1 \text{ mm. Hg}}{\text{ml. per minute}} = 8.10^4 \text{ dyne sec. cm.}^{-5} \right).$$

However, a composition comprising 1 part by weight of said mixture and 100 parts by weight of 7-(2-hydroxypropyl)theophylline and containing the same dose of said mixture and likewise given by intra-arterial infusion, the inversion point occurs at 2.0–2.4 resistance units. This signifies that the vasodilator effect of the composition makes its onset considerably earlier than that of said mixture alone, in other words that the composition induces vasodilatation at a point where said mixture alone would still be raising vascular tone, i.e. causing vasoconstriction. There is thus an exhibition of true synergism between the components. The alpha-adrenergic blocking effect of said mixture is not reinforced by 7-(2-hydroxypropyl)theophylline.

In observing the effect of infusion on cardiovascular parameters in the anaesthetised cat, the hypotensive effect of the composition quite simply comprises the arithmetic sum of the depressor effects of said mixture and 7-(2-hydroxypropyl)theophylline. However, a different and advantageous effect is observed in respect of the effect on heart rate. Whereas said mixture alone elicits a dose dependent central bradycardia, the composition has no significant effect on heart rate.

The increase in enteral effects of compositions of the present invention as compared with the hydrogenated ergot alkaloids is overall greater and longer lived than is the increase in enteral effect of Cafergot® as compared with its ergot alkaloid constituent, ergotamine. Moreover, the hydrogenated ergot alkaloids employed in compositions of the present invention possess a different effect spectrum to that of ergotamine, ergotamine being essentially a vasoconstrictor which is accordingly not suitable for improving cerebral and peripheral blood flow.

In accordance with the invention, there is provided an improved hydrogenated ergot alkaloid composition comprising one part by weight of a hydrogenated ergot alkaloid constituent selected from the group consisting of dihydroergocornine, dihydroergocristine, dihydroergocryptine, and their pharmaceutically acceptable acid addition salts, and between 10 and 150 parts by weight of 7-(2-hydroxypropyl)theophylline. The composition preferably comprises one part by weight of the hydrogenated ergot alkaloid constituent, and 100 parts by weight of 7-(2-hydroxypropyl)theophylline.

The alkaloid constituent may comprise a 1:1:1 parts by weight mixture of the methane sulphonates of dihydroergocornine, dihydroergocristine and dihydroergocryptine. Dihydroergocristine methane sulphonate may similarly be employed as alkaloid constituent.

Examples of unit dosage forms of the hydrogenated ergot alkaloid composition of the invention are as follows:

|  | A | B |
|---|---|---|
| Mixture (1=1=1) of the methanesulphonates of dihydroergocornine, dihydroergocristine and dihydroergocryptine, mg | 1 | 0.5 |
| 7-(2-hydroxypropyl)theophylline, mg | 100 | 50 |

|  | C | D |
|---|---|---|
| Dihydroergocristine methanesulphonate, mg | 1 | 0.5 |
| 7-(2-hydroxypropyl)theophylline, mg | 100 | 50 |

The above examples all show the preferred proportion of alkaloid constituent: 7-(2-hydroxypropyl)theophylline, namely 1:100. But it is to be understood that the proportion of the constituents may be varied quite considerably as is indicated by the above-mentioned proportion range of from about 1:10 to about 1:150.

The invention further extends to galenical preparations of the hydrogenated ergot alkaloid composition which are suitable for enteral administration, particularly peroral administration, e.g. tablets, dragées, capsules, drop, syrups and suppositories. In order to produce such medicinal preparations the mixture of active compounds is worked up with the usual organic or inorganic, phsiologically inert adjuvants. Examples of such adjuvants are: lactose, starch, polyvinyl pyrrolidone, stearic acid, sorbic acid, talcum, methyl cellulose, alcohols, glycerin, sorbitol syrup, hardened fats, vegetable oils, waxes and vaseline. The preparations may furthermore contain suitable sweetening or colouring substances and flavourings.

EXAMPLES OF GALENICAL PREPARATIONS (1) Tablets (composition A)

|  | G. |
|---|---|
| Mixture (1:1:1) of the methane sulphonates of dihydroergocornine, dihydroergocristine and dihydroergocryptine | 0.001 |
| 7-(2-hydroxypropyl)theophylline | 0.100 |
| Talcum | 0.010 |
| Maize starch | 0.020 |
| Lactose | 0.079 |
| Polyvinyl pyrrolidone | 0.006 |
| Cetyl alcohol | 0.0015 |
| Polyethyl glycol 6000 | 0.0025 |
| For a tablet of | 0.220 |

(2) Tablets (composition B)

| | G. |
|---|---|
| Mixture (1:1:1) of the methane sulphonates of dihydroergocornine, dihydroergocristine and dihydroergocryptine | 0.0005 |
| 7-(2-hydroxypropyl)theophylline | 0.0500 |
| Talcum | 0.0050 |
| Maize starch | 0.0100 |
| Lactose | 0.0500 |
| Polyvinyl pyrrolidone | 0.0020 |
| Cetyl alcohol | 0.0005 |
| Polyethylene glycol 6000 | 0.0020 |
| For a tablet of | 0.120 |

(3) Tablets (composition C)

| | G. |
|---|---|
| Dihydroergocristine methane sulphonate | 0.001 |
| 7-(2-hydroxypropyl)theophylline | 0.100 |
| Talcum | 0.010 |
| Maize starch | 0.020 |
| Lactose | 0.079 |
| Polyvinyl pyrrolidone | 0.006 |
| Cetyl alcohol | 0.0015 |
| Polyethylene glycol 6000 | 0.0025 |
| For a tablet of | 0.220 |

(4) Tablets (composition D)

| | G. |
|---|---|
| Dihydroergocristine methane sulphonate | 0.0005 |
| 7-(2-hydroxypropyl)theophylline | 0.0500 |
| Talcum | 0.0050 |
| Maize starch | 0.0100 |
| Lactose | 0.0500 |
| Polyvinyl pyrrolidone | 0.0020 |
| Cetyl alcohol | 0.0005 |
| Polyethylene glycol 6000 | 0.0020 |
| For a tablet of | 0.120 |

The compositions of the invention may be used in the same manner as the said hydrogenated ergot alkaloids. Thus, for example, in treating a patient to improve cerebral and peripheral blood flow, a daily amount of the composition containing about 2.5 mg. of hydrogenated ergot alkaloid would be administered. Therefore, referring to the aforegoing examples of galenical preparations, 2 to 3 tablets of the compositions A or C would be administered each day, and 4 to 6 tablets of the composition B or D would be administered each day.

What is claimed is:

1. A composition useful for treating cerebral and peripheral blood flow disorders comprising one part by weight of a hydrogenated ergot alkaloid constituent selected from the group consisting of dihydroergocornine, dihydroergocristine, dihydroergocryptine, or a pharmaceutically acceptable acid addition salt thereof, and between 10 and 150 parts by weight of 7-(2-hydroxypropyl) theophylline.

2. A composition useful for treating cerebral and peripheral blood flow disorders of claim 1, comprising one part by weight of the hydrogenated ergot alkaloid constituent, and 100 parts by weight of 7-(2-hydroxypropyl)-theophylline.

3. A composition useful for treating cerebral and peripheral blood flow disorders of claim 1, in which the alkaloid constituent comprises a 1:1:1 mixture of the methane sulphonates of dihydroergocornine, dihydroergocristine, and dihydroergocryptine.

4. A composition useful for treating cerebral and peripheral blood flow disorders of claim 1, in which the alkaloid constituent comprises dihydroerogcristine methane sulphonate.

5. A composition useful for treating cerebral and peripheral blood flow disorders of claim 1, in unit dosage form, comprising from about 0.0005 g. to about 0.001 g. of the hydrogenated ergot alkaloid constituent, and from about 0.0500 g. to about 0.100 g. of 7-(2-hydroxypropyl)-theophylline.

6. A method of treating cerebral and peripheral blood flow disorders which comprises administering to a mammal in need of said treatment a therapeutically effective amount of a hydrogenated ergot alkaloid composition comprising one part by weight of an ergot alkaloid constituent selected from the group consisting of dihydroergocornine, dihydroergocristine, dihydroergocryptine or a pharmaceutically acceptable acid addition salt thereof and between 10 and 150 parts by weight of 7-(2-hydroxypropyl)theophylline.

7. A method according to claim 6 in which the composion comprises one part by weight of hydrogenated ergot alkaloid and 100 parts by weight of 7-(2-hydroxypropyl) theophylline.

8. A method according to claim 6 in which the ergot alkaloid comprises a 1:1:1 mixture of the methane sulphonates of dihydroergocornine, dihydroergocristine and dihydroergocryptine.

9. A method according to claim 6 in which the ergot alkaloid comprises dihydroergocristine methane sulphonate.

10. A method according to claim 6 in which the ergot alkaloid composition comprises in unit dosage form, about 0.005 g. to about 0.001 g. of the hydrogenated ergot alkaloid constituent and from about 0.0500 g. to about 0.100 g. of 7-(2-hydroxypropyl)theophylline.

11. A method of enhancing the enternal effect of hydrogenated ergot alkaloids in treating cerebral and peripheral blood flow disorders which comprises orally administering to a mammal in need of said treatment a therapeutically effective amount of a hydrogenated ergot alkaloid composition comprising one part by weight of an ergot alkaloid constituent selected from the group consisting of dihydroergocornine, dihydroergocristine, dihydroergocryptine or a pharmaceutically acceptable acid addition salt thereof in combination with between 10 and 150 parts by weight of 7-(2-hydroxypropyl)theophylline.

12. A method according to claim 11 in which the composition comprises one part by weight of hydrogenated ergot alkaloid and 100 parts by weight of 7-(2-hydroxypropyl)theophylline.

13. A method according to claim 11 in which the ergot alkaloid comprises a 1:1:1 mixture of the methane sulphonates of dihydroergocornine, dihydroergocristine, and dihydroergocryptine.

14. A method according to claim 11 in which the ergot alkaloid comprises dihydroergocristine methane sulphonate.

15. A method according to claim 11 in which the ergot alkaloid composition comprises in unit dosage form, about 0.005 g. to about 0.001 g. of the hydrogenated ergot alkaloid constituent and from about 0.0500 g. to about 0.100 g. of 7-(2-hydroxypropyl)theophylline.

References Cited

UNITED STATES PATENTS 2,715,125   8/1955   Rice _____ 260—256

OTHER REFERENCES

Krantz et al.: Pharmacological Principles of Medical Practice (pp. 775–76), 1958.

Krantz et al.: supra (pp. 659–60).

Drill, Pharmacology In Medicine, p. 429 (1958).

Goodman et al.: Pharmacological Basis of Therapeutics, p. 886 (1965).

STANLEY J. FRIEDMAN, Primary Examiner

U.S. Cl. X.R.

424—261